United States Patent [19]
Klein et al.

[11] Patent Number: 5,452,911
[45] Date of Patent: Sep. 26, 1995

[54] HIGH EFFICIENCY HIGH CLEARANCE CHINSTAY AND METHOD OF MAKING SAME FOR BICYCLES

[75] Inventors: Gary G. Klein; Darrell W. Voss, both of Chehalis, Wash.

[73] Assignee: Klein Bicycle Corporation, Chehalis, Wash.

[21] Appl. No.: 105,577

[22] Filed: Aug. 13, 1993

[51] Int. Cl.⁶ .................................................. B62K 19/02
[52] U.S. Cl. ............................................................. 280/288
[58] Field of Search ................................. 280/288, 281.1, 280/274, 284

[56] References Cited

U.S. PATENT DOCUMENTS 600,329  3/1898  Burnham .................................. 280/288

FOREIGN PATENT DOCUMENTS 3220079  9/1991  Japan ...................................... 280/288

Primary Examiner—Karin L. Tyson
Assistant Examiner—Kevin Hurley
Attorney, Agent, or Firm—Jim Zegeer

[57] ABSTRACT

There is disclosed a uniquely shaped bicycle chainstay structure produced using modern metal working methods, without the use of welding. The uniqueness of the structure allows a significant shortening of the chainstay length while increasing the tire and chain-ring clearances. An accomplishment not possible using prior art methods.

3 Claims, 6 Drawing Sheets

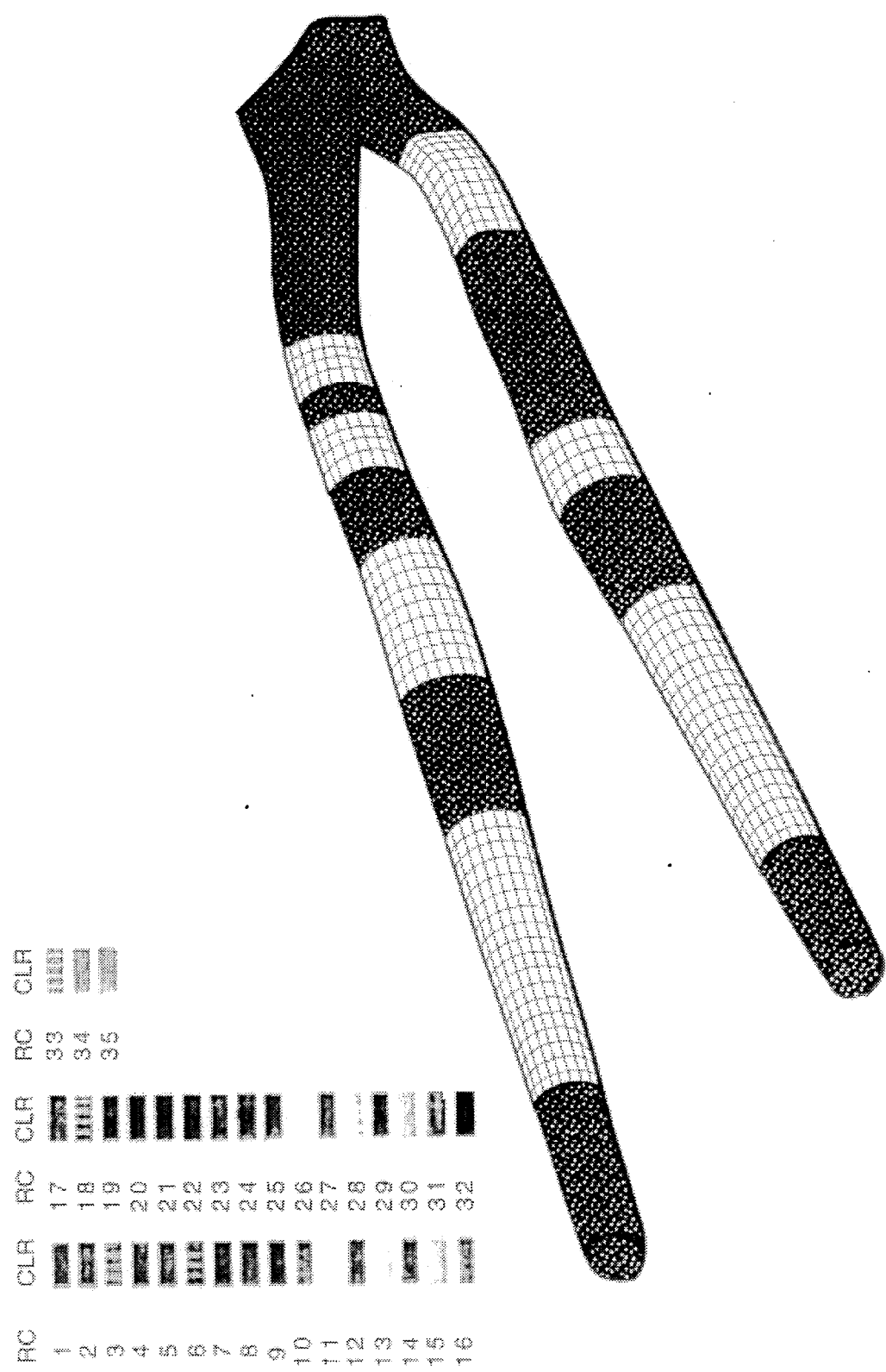

HIGH EFFICIENCY HIGH CLEARANCE CHINSTAY AND METHOD OF MAKING SAME FOR BICYCLES

INTRODUCTION

This invention relates to high efficiency high clearance arrangement for the chain support structure (chainstay) of bicycle frames and method of making same. This construction is unique in that it allows a minimum length chainstay geometry, provides for maximum tire and chain-ring clearances (significantly more than other prior art designs) while maintaining adequate strength to handle the peak chain impulse loads and other external loads developed during a hard sprint or climbing maneuver. It does all of this at a reduced weight.

BACKGROUND

Chainstays are important members of the rear triangle structure of a bicycle. Not only are they significant load carrying members but their overall geometry plays an important role in the riding and handling characteristics of the bicycle system. Generally speaking, the goal of the competition bicycle designer is to minimize the length of the chainstay while maximizing the tire and chain-ring clearances. Generally these are two very conflicting goals.

Minimizing the length of the chainstay benefits the bicycle in two respects. First, it gives the bicycle a quicker steering response. This is important in competition riding. Second, it improves the traction of the rear tire. It accomplishes this by placing more of the riders weight over the rear tire. It also causes a greater portion of the pedal forces to be reacted by the rear axle, since the pedals are also moved closer to the rear axle. The improved traction is important in hard sprint and climbing maneuvers.

Maximizing the tire and chain-ring clearances are especially important for mountain bicycles. Because of the environment in which these bicycles are ridden and the oversized tires they generally use (with their pronounced tread), more clearance is needed to handle mud and other debris clinging to the tire tread.

Current production bicycles generally have reached the best possible compromise between the length of the chainstay and the tire and chain-ring clearances. A larger diameter of the chainstay is beneficial to provide lightweight bending and torsional stiffness, and to support the high loads placed upon the chainstays, from the rear wheel, bottom bracket and imposed chain loads. Typically chainstays are bent, dented or crimped to provide some degree of tire and chainring clearance. The dented or crimped chainstays appear to lose substantial strength as a result. There is not much more that can be achieved using the prior art production methods. However, with this invention the limitations and restrictions of the past have been diminished and it is now possible to pack a more efficient, higher strength structure in a smaller space to allow both shorter chainstays and more tire and chain-ring clearances than possible before.

BRIEF DESCRIPTION OF THE DRAWINGS

FIG. 5 is a schematic illustrating the wall thickness profile of the entire chainstay structure incorporating the invention.

DETAILED DESCRIPTION OF THE INVENTION

Figure 1:
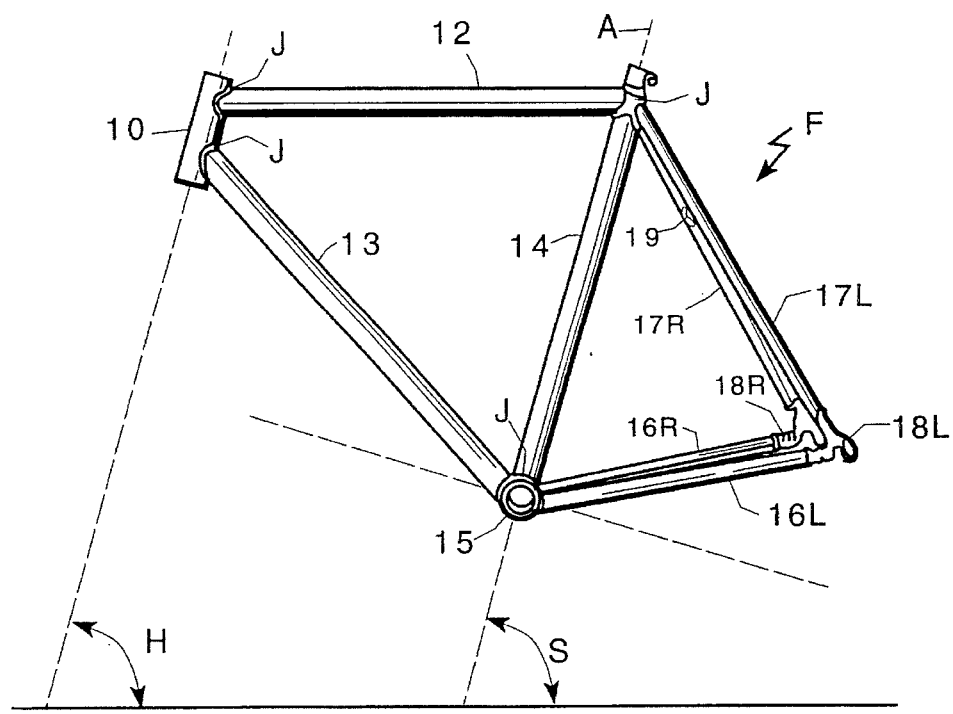
FIG. 1 is a side isometric view of a prior art bicycle design.

FIG. 1 shows a lightweight bicycle frame F of a typical prior art design. The frame includes a head-tube 10, top-tube 12 secured (as by welding) at the forward end to head-tube 10, a down-tube 13 secured at its forward end to head-tube 10, a seat-tube 14 secured at its upper end to the trailing end of the top tube 12, a bottom bracket shell 5 secured to the lower ends of the downtube 13 and seat tube 4, respectively, two chainstay tubes 16L and 16R secured at their forward ends to bottom bracket shell 5, two seatstay tubes 17L and 17R secured at their upper ends to seat tube 14 and at their lower ends to two rear fork ends (or drop outs) 18L and 18R, and a seatstay bridge 19 located above the rear wheel (not shown).

Figure 2:
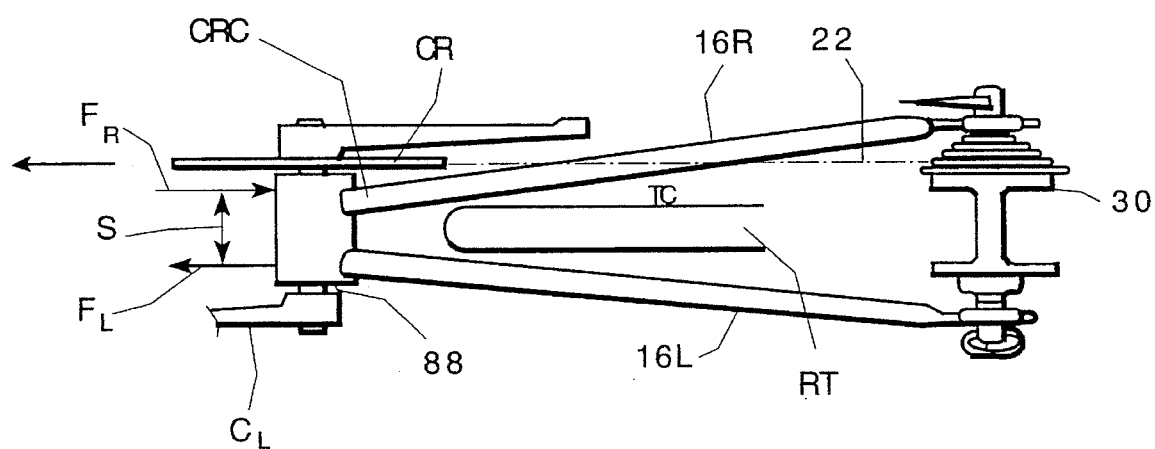
FIG. 2 is a top view, looking down, on the chainstay structure of a prior art bicycle design.

The frame thus is comprised of a front triangle structure, including the top- head- and down-tubes and a rear triangle structure consisting of the seat, seatstay and chainstay tubes. An important part of the rear triangle are the chainstay tubes 16L and 16R. For the reasons mentioned earlier, it is desirable to minimize the length of the chainstay tubes. However, conflicts exist with the clearances of the tire and chain-ring and with the side-to-side spacing of the chainstay on the bottom bracket. This is illustrated in FIG. 2. FIG. 2 is a close-in view of the chainstay showing the chainstay tubes 16L and 16R, chain-ring CR, bottom bracket BB, rear axle assembly 30 and the rear tire RT. The side-to-side spacing S of the chainstay on the bottom bracket BB must be kept as large as possible to provide lateral stability to the rear triangle structure. Generally this is around 2 inches for prior art designs. At the axle end of the chainstay, the width W is fixed by the industry standard for axle assemblies. As the chainstay length L is shortened, the tire clearance TC and chain-ring clearance CRC both diminish.

Because of the limited metal forming methods used in prior art chainstay designs, the geometry of these designs were generally quite limited. However, with modern metal forming technology used in the present invention, the invention places material in the structure where it is needed, thereby minimizing weight while at the same time breaking out of the section geometry and overall shape restrictions of the past. These new methods allow tubing material to be virtually sculptured to fit the need. Section shape, wall thickness and overall geometry of the part may all be continuously shaped using these modern techniques.

FIGS. 3A–G provide a detailed description of a chainstay construction incorporating the invention. Actually, it is a description of one of the chainstay tubes 10. The opposite tube has an identical shape, as indicated in FIG. 4, except for the wall thickness profile of the tubing. The wall thickness profile for the entire chainstay structure is illustrated in FIG. 5.

In FIGS. 3A–G, the connection to the bottom bracket is at Section B—B. The opposite end of the tube connects with the rear axle dropout. The section at A—A is the critical section where the highest bending moment occurs. This also represents the area of the structure with the minimum tire and chain-ring clearances. In this region of the structure, the section is rectangular with an exemplary wall thickness of 0.075" for the chain side tube and 0.049" for the non-drive side. (See Klein U.S. Pat. No. 4,621,827.) This same thickness extends slightly rearward of this section (leftward in FIG. 3A towards the dropout end 41) and all the way to Section B—B the bottom bracket connection end 42, since this entire area represents the highly stressed part of the structure. The remaining parts of the structure have tapering wall thicknesses too conserve weight. This thickness profile was determined using the finite element computer modeling method which is discussed later. The metal thickness shown in FIG. 5 are final net thicknesses, e.g., after swaging.

The process of making chainstays for mountain bicycles according to this invention comprises the steps of:

1) Forming a tube having a uniform external diameter along a straight axial centerline which is substantially equal to the maximum diameter of the tube and a wall thickness which varies from a maximum thickness proximate the start the maximum diameter to a minimum wall thickness at the dropout section and from the maximum toward the bottom bracket section the wall thickness gradually decreases to a first intermediate thickness and then gradually increases in thickness to a second intermediate thickness at the bottom bracket section. See FIGS. 6 for the non-drive side chainstay tube and FIG. 6B for the drive side chainstay.

2) The tube thus formed is swaged to
   a) to form a taper from the maximum diameter to a minimum diameter at the dropout, and
   b) to an hourglass shape in the tire and chain ring clearance section. See FIG. 6C.

Figures 3C, 3D, 3E, 3F, 3G:
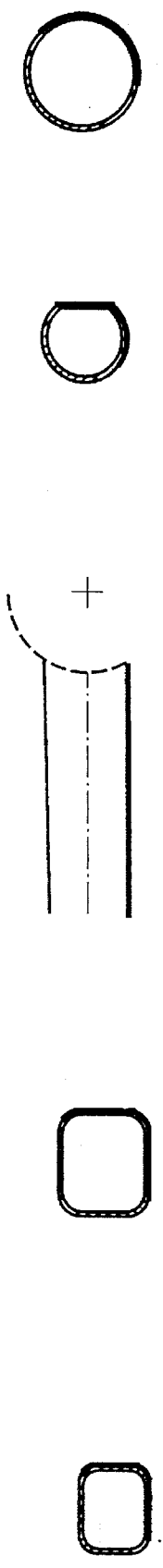
FIGS. 3A–3G are is a detailed drawings of a preferred embodiment of the invention with exemplary dimensions provided.
Figure 3A:
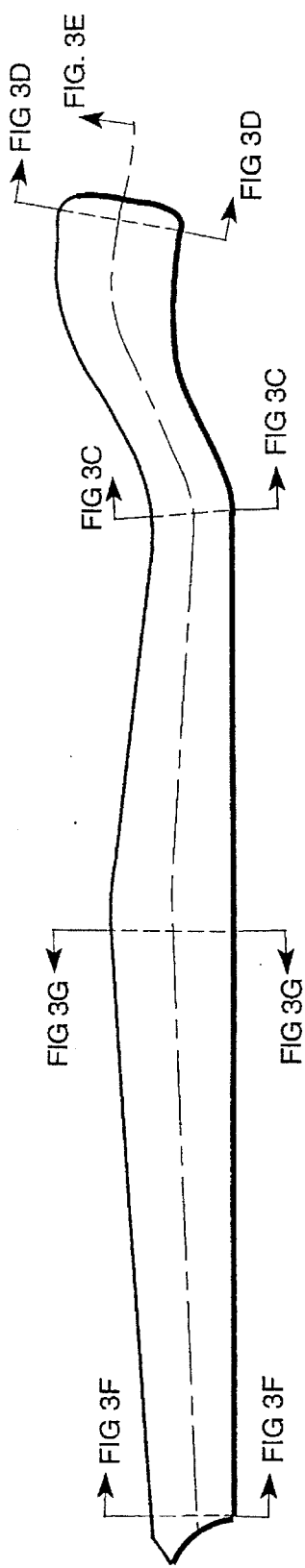
Figure 3B:
Figure 4:
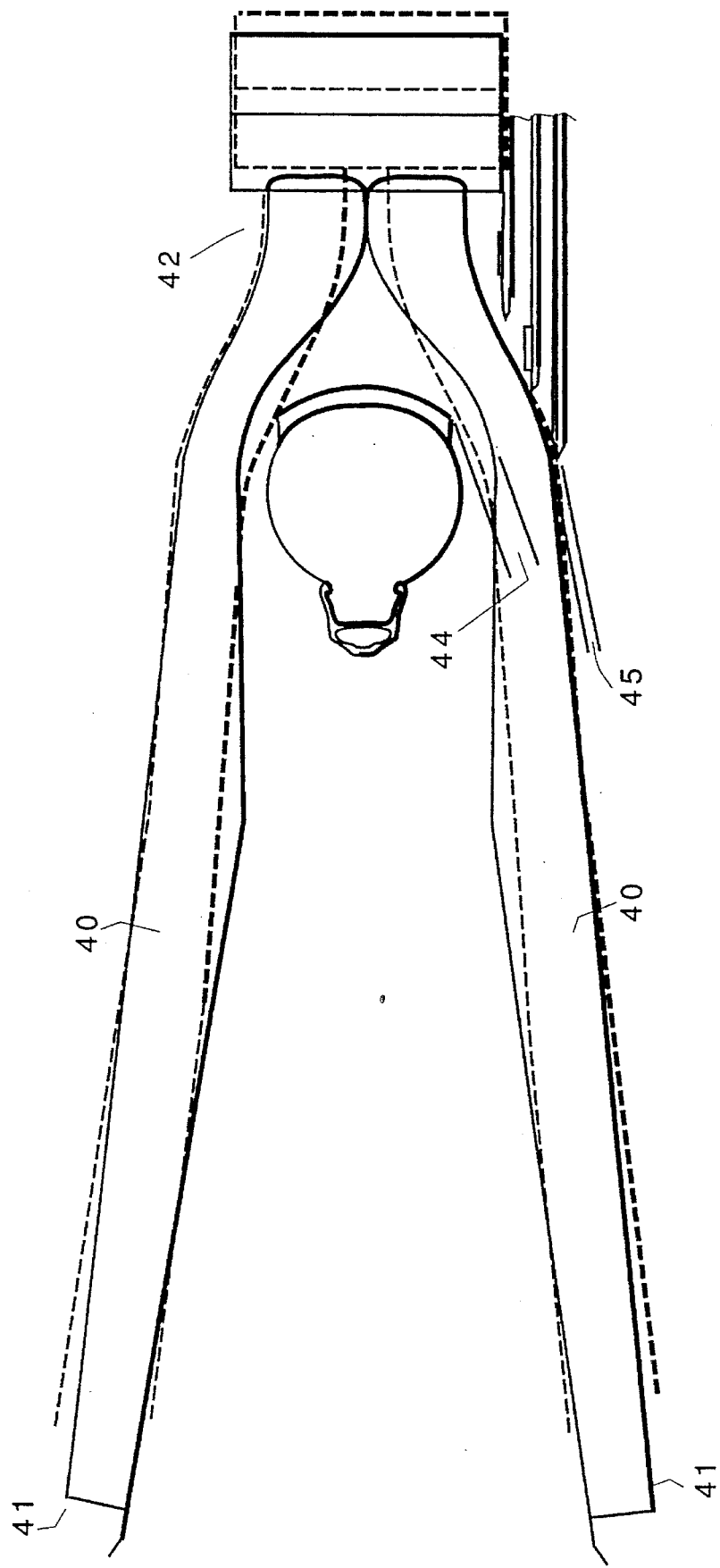
FIG. 4 is an assembly drawing comparing the chainstay structure of this invention compared with a prior art design shown in dashed lines in the area of interest.

3) Then the tube hourglass shape is swaged into a shape such that there is a gradual transition from circular to rectangular and wherein the wheel and non-wheel sides are made flat and the top and bottom sides are made flat and have the configuration shown in the side elevational view of FIG. 3B, 4) The tube is then compression formed in the bottom bracket portion to a substantially rectangular section or shape wherein said wheel and non-wheel sides are flat and parallel and said top and bottom surfaces are flat and parallel as shown in FIG. 3B. In the compression forming, preferably no metal is removed.

5) Then the hourglass shape is bent at proximate the minimum diameter and in the direction of the wheel side of the tube, such that said non-wheel side and the wheel sides both gradually diverge from the centerline of the wheel plane toward the bottom bracket section.

6) The tube proximate the intersection of the wheel chain ring clearance section with said bottom bracket section is bent in the direction of the non-wheel side such that said centerline at bottom bracket section is normal to said bottom bracket.

7) Finally, the ends of said bottom bracket section of the wheel and non-wheel sides are shaped to conform to the curvature of said bottom bracket. The dropout ends may be shaped as shown in the drawings or have the dropouts socket type dropouts adhesively adhered thereto.

Several considerations were made in deriving the overall shape of the chainstay tubes accoring to the invention. First, the overall length of the chainstay was reduced by approximately 0.200 inches, compared to typical prior art designs, to enhance the steering response of the frame. Second, the tire clearance 44 was set at a minimum of 0.250 inches. This is approximately 5 times the clearance of prior art designs. The chain-ring clearance 45 was set at approximately 0.125" minimum. These clearances are illustrate in FIG. 4b. Third, the side-side spacing of the chainstay tubes on the bottom bracket (Item S, FIG. 2) was maintained at a minimum of 2.00 inches but additional section was added in the region to improve the side-to-side stiffness of the rear triangle and to reduce the stresses in the welded joint. Fourth, tapered sections were shaped to maintain good aesthetics while minimizing material weight. Fifth, the dropout end of the chainstay tubes were increased in thickness to accommodate local stresses and the weld at the rear axle dropout connection, or adhesive bonding of the dropouts to the ends of the chainstay tubes.

In addition to the above, the invention incorporates the following features:

1. Avoidance of crimping or denting the tube structure
2. Circumference of chainstay tube is:
   large at section BB where a welded or bonded connection is made to bottom bracket,
   small by chainring/tire space,
   large in center section,
   small at dropout.
3. Smooth load path with no sharp transitions
4. Rectangular sections for section stability
5. Top and bottom surfaces vary continuously with gradual variations lending best lateral support to side walls.
6. While a metal chainstay is disclosed herein, the invention is applicable to composite laminate tube structures which may be molded using the process disclosed in our application Ser. No. 08/105,576 entitled "BICYCLE FRONT FORKS AND METHOD OF MAKING SAME" filed concurrently herewith.
7. Increases section thickness provided at small section through tire/chainrings for reinforcement.
8. Right chainstay heavier than left chainstay as disclosed in Klein U.S. Pat. No. 4,621,827.
9. Smooth tapered thickness between sections.
10. Weight is reduced by designing the smooth load path, reducing the need for additional wall thickness, as in prior art dented designs.
11. Chainstay is principally adapted for bending and compressive forces.

STRUCTURAL CONSIDERATIONS

To design a minimum weight structure requires a good understanding of the design loads applicable to the part, and a precise knowledge of the response of the structure to these design loads. The only practical way to optimize a structure is by computer modeling. One modeling technique commonly used in industry today is the finite element analysis (FEA) method. This is a mathematical procedure for evaluating virtually any complex structure on the computer.
The Finite Element Analysis Method:

The FEA method breaks the material continuum of a structure into a finite number of mathematical elements. These elements may be two or three dimensional beams, two or three dimensional plates and shells or three dimensional solids. The deformation characteristics of these elements are defined in terms of their nodal displacements (nodes are the connecting points of the finite elements) and the forces externally applied to these nodes. By defining the material properties, the geometry of the finite element system, the locations and magnitudes of the applied forces and the boundary conditions of the structure, the displacement and stress distribution within the material continuum can be calculated.

Both static and dynamic analyses can be conducted using the FEA method. However, for the evaluation of the chainstay structure, a quasi-static approach was used. This method consists of using simple modeling techniques to determine the dynamic (or impulse) loads applied to the structure. These dynamic (or impulse) loads are then treated as static loads in a static FEA procedure. This approach is generally slightly conservative, however, it has been found to be quite effective for most practical design applications. This approach is considerably faster (hence, less expensive) than a full, dynamic FEA procedure.

Figure 6A:
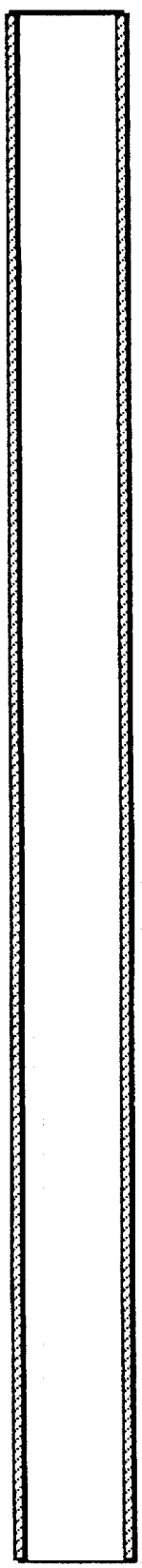
FIGS. 6A is a sectional view of round metal tube (aluminum alloy, steel titanium, etc.) which is to be shaped according to this invention into a non-drive side chainstay tube for a mountain bicycle with exemplary dimensions.
Figure 6B:
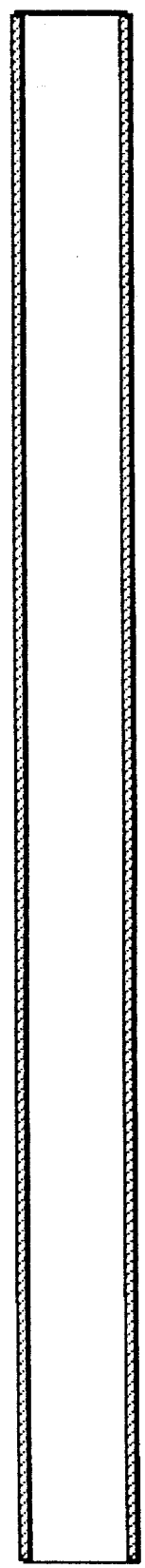
FIG. 6B is a similar sectional view with exemplary dimensions given for the drive side chainstay tube.
Figure 6C:
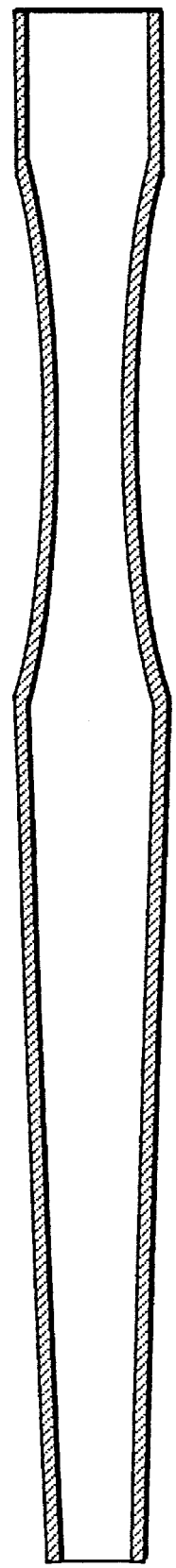
FIG. 6C is a sectional view of the tubing after swaging to taper same and forming the tire/chain ring clearance and bottom bracket sections.
Figure 7:
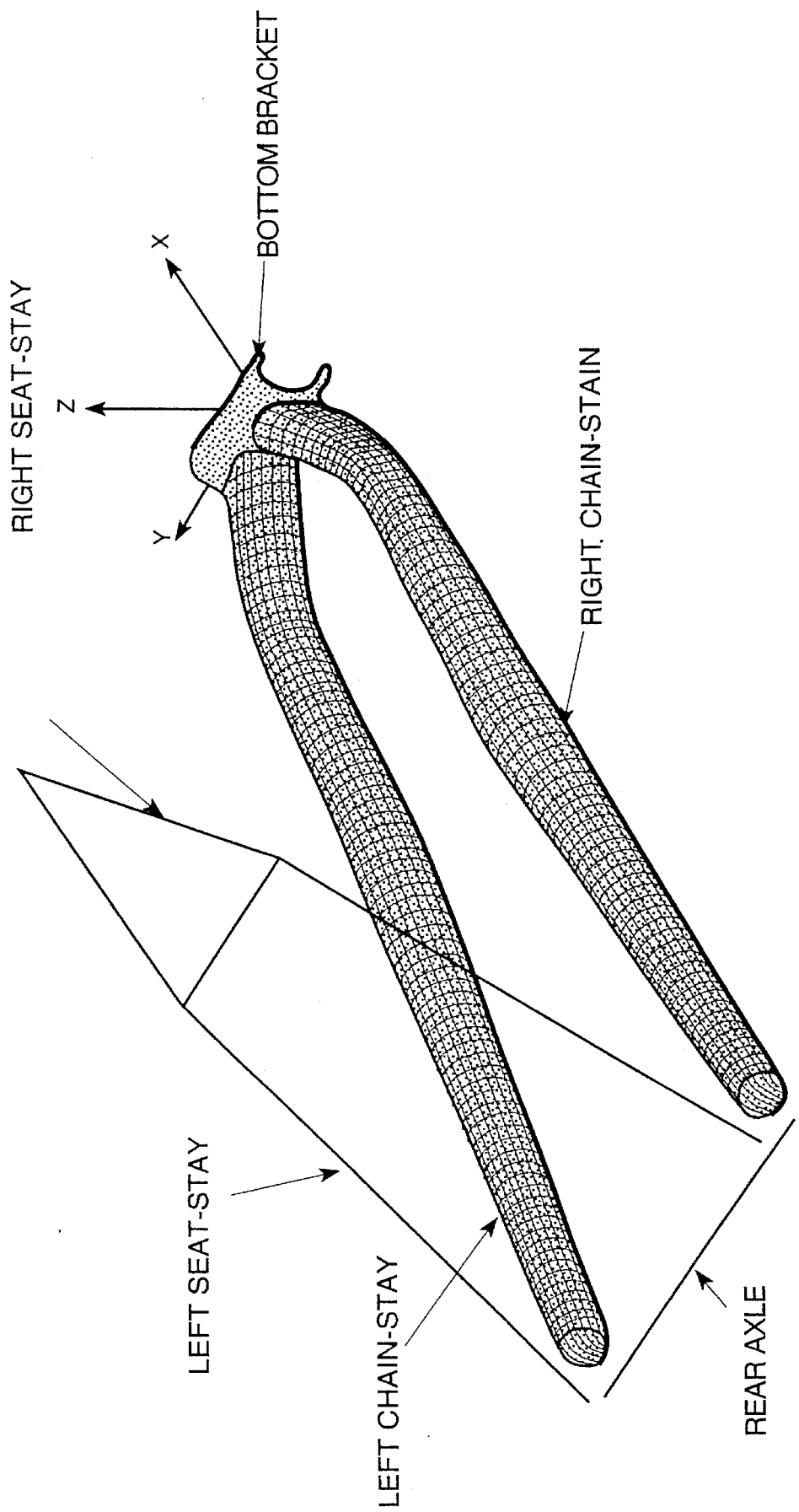
FIG. 7 illustrates the FEA model used for evaluating the disclosed chainstay design.

Chainstay Finite Element Model:

The FEA model used for the chainstay analysis is illustrated in FIG. 6. The seat-stay and rear axle members in the model were simulated using 3-dimension beam elements. The remaining parts of the structure were simulated using 3-dimension shell elements. The structural coupling between the beam and shell elements were accomplished using node coupling commands.

Appropriate boundary conditions were applied at the bottom bracket and at the top of the seat-stay tubes to simulate the remaining parts of the bicycle structure. The applied loads, including the chain load and the tire reaction loads, were applied to nodes on the rear axle beam.

The results of the analysis indicated that the chainstay design in FIGS. 3A–G and 5 provide an adequate margin of safety for the design loads, which included a maximum chain load and a maximum side rim load.

While preferred embodiments of the invention have been shown and described, it will be appreciated that various modifications and adaptations of the invention will be apparent to those skilled in the art.

What is claimed is:

1. A chainstay tube for mountain bicycles having a bottom bracket portion, a tire/chain ring clearance portion and a dropout portion coupled to said tire/chain ring clearance sections by a tapered tube section, said tire/chain ring clearance section having a center, said chainstay tube having a bottom bracket end, a dropout end, a tire tangent point and a midpoint, said chainstay tube comprising a relatively large rectangular section at said bottom bracket end, changing to a relatively small rectangular section near said tire tangent point proximate the center of said tire/chain ring clearance section, then tapering to a relatively large section near the midpoint of said chainstay tube and then tapering to a relatively small; section at said dropout end of said chainstay tube, to provide a reduced weight, high efficiency, high clearance chainstay tube.

2. The chainstay tube defined in claim 1 wherein said chainstay tube is made from metal.

3. The chainstay tube defined in claim 1 wherein said chainstay tube is made from a composite laminate.

* * * * *